US007788394B2

(12) United States Patent
Gregotski et al.

(10) Patent No.: US 7,788,394 B2
(45) Date of Patent: Aug. 31, 2010

(54) STREAMING CONTENT OVER AN INTERNET PROTOCOL NETWORK

(75) Inventors: Mark E. Gregotski, Jamison, PA (US); Terence R. Brogan, Norton, MA (US)

(73) Assignee: General Instrument Corporation, Horsham, PA (US)

( * ) Notice: Subject to any disclaimer, the term of this patent is extended or adjusted under 35 U.S.C. 154(b) by 467 days.

(21) Appl. No.: 11/469,072

(22) Filed: Aug. 31, 2006

(65) Prior Publication Data

US 2008/0059645 A1 Mar. 6, 2008

(51) Int. Cl.
*G06F 15/16* (2006.01)
(52) U.S. Cl. .................. 709/231; 709/226; 709/208; 709/201; 370/401
(58) Field of Classification Search ................. 709/231, 709/226, 208, 201; 370/401
See application file for complete search history.

(56) References Cited

U.S. PATENT DOCUMENTS

| | | | | |
|---|---|---|---|---|
| 5,996,015 | A * | 11/1999 | Day et al. | 709/226 |
| 6,324,582 | B1 * | 11/2001 | Sridhar et al. | 709/230 |
| 7,215,663 | B1 * | 5/2007 | Radulovic | 370/356 |
| 7,272,650 | B2 * | 9/2007 | Elgebaly et al. | 709/227 |
| 2003/0105604 | A1 * | 6/2003 | Ash et al. | 702/100 |
| 2005/0055724 | A1 * | 3/2005 | Atad et al. | 725/80 |
| 2006/0056409 | A1 * | 3/2006 | Piche et al. | 370/389 |
| 2007/0043876 | A1 * | 2/2007 | Varga et al. | 709/245 |
| 2008/0228854 | A1 * | 9/2008 | Grimault et al. | 709/201 |
| 2008/0304571 | A1 * | 12/2008 | Tsukagoshi et al. | 375/240.25 |

\* cited by examiner

*Primary Examiner*—Tonia L M Dollinger
*Assistant Examiner*—Kyung H Shin

(57) ABSTRACT

Described herein are embodiments that facilitate the streaming of content over an Internet Protocol (IP) network, transparently, in a Network Address Translation (NAT) environment or a non-NAT environment. In one embodiment, there is provided a method for streaming content over an Internet Protocol (IP) network by a content provider having a content control server and a content-streaming server, the method comprising: the content control server receiving a first request from a destination for a content-streaming session; the content control server setting up the content-streaming session in response to the first request; the content-streaming server receiving an upstream message from the destination to establish communication between the content-streaming server and the destination in accordance with the set-up content-streaming session; the content control server receiving a second request to initiate streaming of the content for the set-up content-streaming session; and the content-streaming server streaming the content to the destination in response to the second request.

16 Claims, 4 Drawing Sheets

STREAMING CONTENT OVER AN INTERNET PROTOCOL NETWORK

Video-on-Demand (VOD) systems allow users to interactively select and watch video content over a network at any time desired or demanded by the users. The video content is either: a) "streamed" to a set-top box, whereby viewing is allowed while the video content is being downloaded; or b) "downloaded" to the users, whereby an entire program is downloaded to the set-top box before viewing is allowed. As referred herein, a set-top box (STB) is a device that connects to a content player, a viewing device, or a display (e.g., television, monitor, and the like) and some external source of signal, and turns the signal into video content for display or presentation on the viewing device. The STB may receive the signal over the air (e.g., via an off-air antenna or satellite dish) or from a wired connection (e.g., via coaxial cable, telephone line, or the like), whereby the signal is provided by an external source, such as a broadcast television station, cable television provider, satellite television provider, or any other content provider or distributor.

Traditional VOD systems employ signaling between the STB and a VOD command and control server to navigate VOD content, purchase movies, and control the playback of a VOD session. Thus, there is no direct messaging between the set-top and the video pump that actually provides streaming content to the STB. The VOD command and control server receives the session information, from the server administrator or an end user, and instructs the video pump how to address the VOD content for the streaming session. The video pump typically uses a User Datagram Protocol-based (UDP-based) protocol, such as Real-time Transport Protocol (RTP) or Moving Picture Experts Group (MPEG) over UDP, to stream the VOD content through an Internet Protocol (IP) network in accordance with the destination IP address and UDP port provided by the VOD command and control server, which the video pump uses to fill in the information in the IP header destination fields of the IP datagrams or packets of the VOD content.

As referred herein, a VOD headend server is a VOD command and control server that provides metadata/navigation session management and access or playback control (e.g., pause, play, fast forward, fast rewind, stop) of the VOD content streaming from a video pump, as commanded by the VOD command and control server or the user's STB. As also referred herein a video pump is a VOD streaming server that formats and organizes the VOD content received from one or more content servers into data streams for feeding into a network for distribution to the individual end users, who are individuals or any other entities that purchase, subscribe, or are authorized to request or demand access to the VOD content from a content provider. Thus, the VOD headend server and the streaming server are typically maintained by such a content provider, distributor, MSO or telephone company.

In traditional cable TV based VOD systems, the video pump and receiving STB are instructed to tune to a particular RF channel and use certain keys to encrypt and decrypt the content. The VOD content is not "addressed" to the requesting STB. The video pump and the network between the video pump and the VOD content requesting STB will cause the content to be potentially accessible by a plurality of STBs in a region that includes the VOD content requesting STB. Only one STB in that plurality will know a) which frequency to tune to and b) what key(s) to use to decrypt the content such that only the VOD content requesting STB will be able to provide the VOD content in the clear to the viewer's presentation device such as a television or stereo. This changes with the introduction of a home centralized gateway device.

Many content providers are moving toward the use of an integrated, centralized gateway device in the home to provide their customers or subscribers with multiple different communication services, such as telephone, Internet, and television services. They see such an integrated, centralized home gateway as an opportunity to provide different data services to different home devices in an efficient manner. Accordingly, there have been recent introductions of home gateway devices in the form of Internet-Protocol-based (IP-based) multimedia routers that support Network Address Translation (NAT) to provide connections to different home devices from a single assigned public IP address.

The introduction of the aforementioned centralized home gateways with NAT support poses a technical challenge for set-top services that typically receive streaming video over UDP/IP. When the VOD content requesting STB sends a request for VOD content upstream, the packets travel from the STB, through the centralized home gateway, through the network and to the command and control VOD server. As the packets travel through the centralized home gateway, it stores the destination address of those packets. In this way, when the command and control VOD server sends packets downstream to the STB, the centralized home gateway recognizes the source address of those packets and allows them to pass into the local home network. The STB, however, never sends packets directly to the video pump providing it with VOD content. Thus, when the video pump begins transmitting VOD content down to the STB, the source address of that content is not known to the centralized home gateway. It therefore determines that those packets of VOD content are not for this home and are not passed onto the local home network.

SUMMARY

In an IP-based network delivery of content such as VOD, it is desired to have a method for streaming such a content to a receiver, such as a STB, regardless of whether there is an intervening NAT-enabled device or whether there is prior knowledge of the NAT type or variation employed by such a device. Accordingly, described herein are methods and systems for streaming content, such as VOD, over IP to a receiver, such as a STB, that is applicable in both a NAT environment and a non-NAT environment.

In one embodiment of the present invention, there is provided a method for streaming content over an Internet Protocol (IP) network by a content provider having a content control server and a content-streaming server, the method comprising: the content control server receiving a first request from a destination for a content-streaming session; the content control server setting up the content-streaming session in response to the first request; the content-streaming server receiving an upstream message from the destination to establish communication between the content-streaming server and the destination in accordance with the set-up content-streaming session; the content control server receiving a second request to initiate streaming of the content for the set-up content-streaming session; and the content-streaming server streaming the content to the destination in response to the second request.

In another embodiment, there is provided a system for streaming content over an Internet Protocol (IP) network, comprising a content control server operable to set up a content-streaming session for streaming the content; a content-streaming server operable for streaming the content in accordance with the content-streaming session; and a receiver operable to request the set-up of the content-streaming session by the content control server and to initiate contact with the content-streaming server for bi-directional communication with the content-streaming server.

In still another embodiment, there is provided a computer readable medium on which is encoded program code for facilitating streaming of content over an Internet Protocol (IP) network, the program code comprising: program code for requesting a content streaming session over the IP network from a content control server so as to receive a streaming of a requested content; program code for initiating a contact message over the IP network to a content-streaming server upon set-up of the content streaming session by the content control server, wherein the content-streaming server is designated by the set-up content streaming session, and wherein the contact message is for establishing bi-directional communication with the content-streaming server; program code for requesting the streaming of the requested content from the content control server; and program code for receiving the streaming content from the content-streaming server in response to the program code for requesting and in accordance with the established bi-directional communication.

BRIEF DESCRIPTION OF THE DRAWINGS

Embodiments are illustrated by way of example and not limited in the following figure(s), in which like numerals indicate like elements, in which.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

Throughout the present disclosure, discussions are made with reference to VOD content. However, it should be understood that such discussions are also applicable to any media content that is requested or demanded by an end user. Examples of media content include audio, video, or textual content, or any combination thereof. Thus, for example, VOD headend servers are specific examples of content command and control servers for VOD session management, and VOD streaming servers (or video pumps) are specific examples of content streaming servers for streaming VOD to the users.

As referred herein, a server is a computer or network of computers. Examples of a server include but are not limited to one or more desktop computers, one or more laptop computers, one or more mainframe computers, one or more networked computers, one or more processor-based devices, or any similar types of systems and devices. Thus, a server includes one or more processors of any of a number of computer processors, such as processors from Intel, Motorola, AMD, and Cyrix. Each processor is coupled to or includes at least one memory device, such as a computer readable medium (CRM). The processor is operable to execute computer-executable program instructions stored in the CRM, such as program code of applications, to run the applications. The computer-executable program instructions include code from any suitable computer-programming language, such as C, C++, C#, Java, or the like. Embodiments of a CRM include, but are not limited to, an electronic, optical, magnetic, or other storage or transmission device capable of providing a processor of the server with computer-readable instructions. Other examples of a suitable CRM include, but are not limited to, a floppy disk, CD-ROM, DVD, magnetic disk, memory chip, ROM, RAM, an ASIC, a configured processor, any optical medium, any magnetic tape or any other magnetic medium, or any other medium from which a computer processor is operable to read instructions.

As also referred herein, a network of devices, such as computers, provides communication connections between the devices in the network via one or more communication protocols. For example, an IP network facilitates communication between devices in such a network using IP (Internet Protocol), which is a well known communication protocol.

System

Figure 1A:
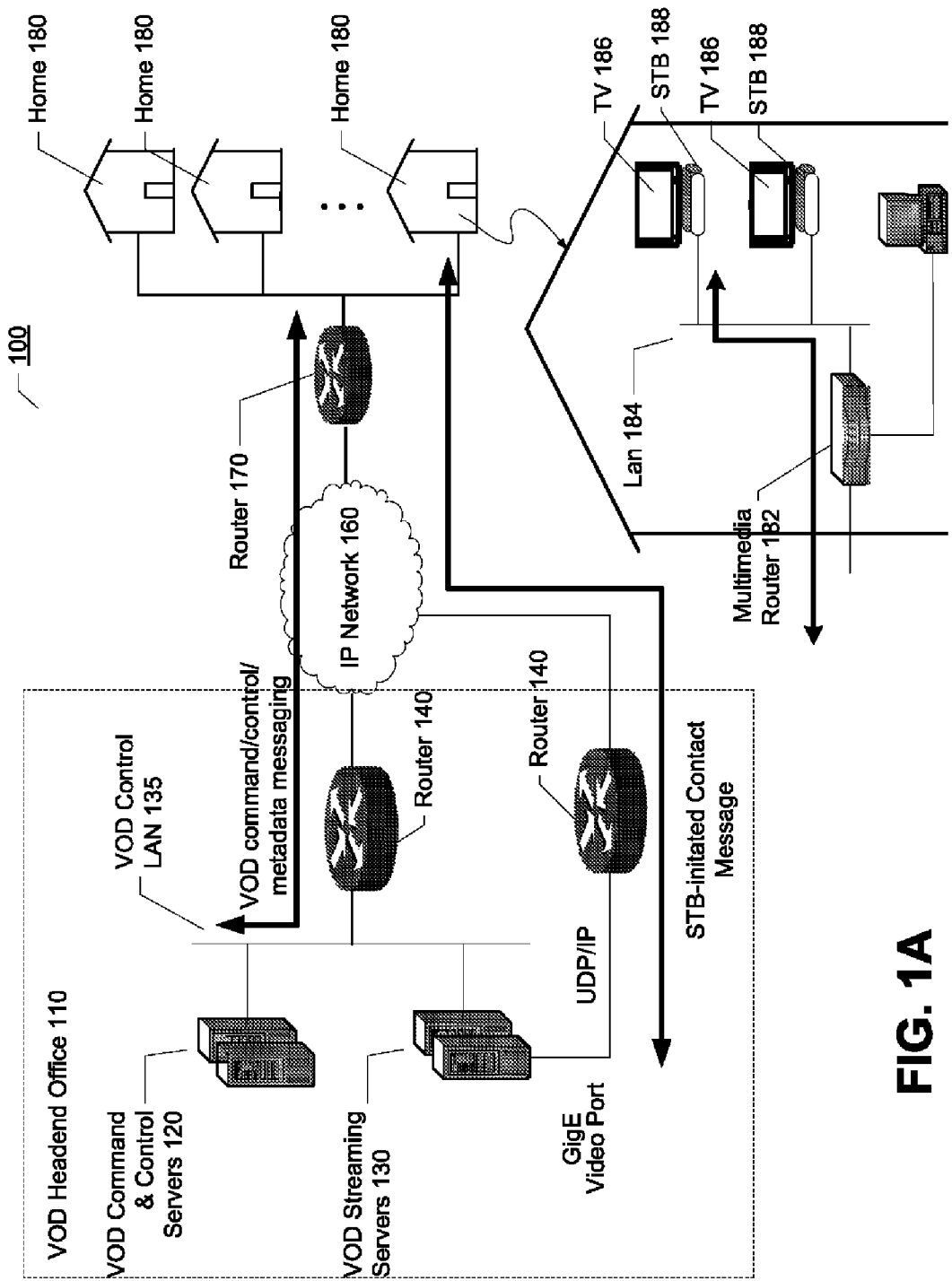
FIG. 1A illustrates a system 100 for streaming content over an Internet Protocol (IP) network to a STB with an intervening multimedia router supporting NAT.

FIG. 1A illustrates a system 100 for streaming VOD content over an IP network to a STB with an intervening multimedia router supporting NAT. The system 100 includes one or more VOD command and control (or headend) servers 120 and one or more VOD streaming (or video pump) servers 130 located in a VOD headend office 110. As noted earlier, each VOD headend server 120 provides metadata/navigation management of VOD sessions and access or playback control (e.g., pause, play, fast forward, fast rewind, and stop) of the VOD content streaming from a video pump, as commanded by the server administrator or the user's STB. The headend servers 120 and video pumps 130 communicate with one another via a local area network (LAN) 135, which is operable as a VOD control LAN for the headend servers 120 to control the video pumps 130. VOD content is streamed from the video pumps 130 through either a public (e.g., Internet) or private IP network 160, via one or more routers, switches, or the like 140. Coming out of the IP network 160, the streamed VOD content is directed to one or more residences, households, homes, lodging units, or designated environments 180 by one or more routers, switches, optical line/network terminators (OLT/ONT), digital subscriber line access multiplexers (DSLAM), or the like 170.

The video pump 130 is operable to: a) receive the upstream message from the STB 188; b) obtain therein the translated set-top IP address and UDP port number of the destination STB 188; c) verify that the session ID, or some other given payload information, included in the upstream message corresponds to the session established for that particular STB 188 by the VOD headend server 120; d) send an acknowledgement to a VOD application in the STB 188 that initiated the VOD session that the upstream message was successfully received; and e) stream the on-demand content using the translated IP address and UDP port number that was obtained once it receives a start-streaming command from the VOD headend server 120.

Each residence 180 contains an integrated, centralized gateway device in the form of a multimedia router 182 that supports some implementation of NAT. As noted earlier, common protocols for streaming IP-based video are RTP or MPEG over UDP. Each residence 180 also includes a LAN 184 for connecting one or more home devices 186, via IP STBs, receivers, decoders, or subscriber terminals 188 as needed. VOD messaging to access or control the streaming content from each home device 186 is transmitted from a VOD application in each STB 188, through the home LAN 184, to the centralized home multimedia router 182, which forwards it through a router 170 to the IP network 160 for transmission to the VOD headend office 110 and onwards to the one or more VOD headend servers 120 therein.

Figure 1B:
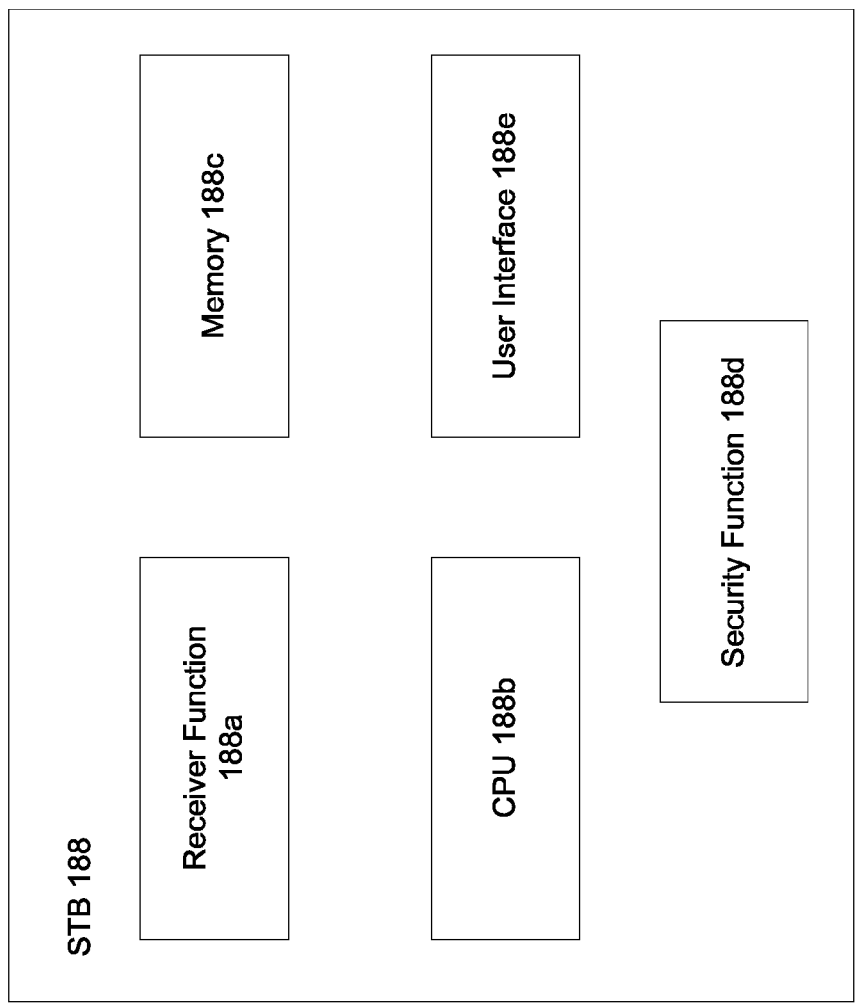
FIG. 1B illustrates a set top box (STB) that may be used in the system 100 of FIG. 1A.

FIG. 1B illustrates an STB 188 in accordance with an embodiment of the present invention. Each STB (receiver, decoder, or subscriber terminal) 188 is shown having a receiver function 188a, a central processing unit (CPU) 188b, a memory 188c, a security function 188d, and a user interface 188e. The STB 188 may be implemented using any known hardware, firmware, and/or software. The receiver function 188a refers to any of a number of functions that the STB 188 may implement, such as displaying particular television programs or channels (e.g., VOD), changing channels (i.e., tuning), accessing user private data (e.g. credit card numbers, personal preferences, etc.), ordering pay-per view programs, enabling a parental lockout capability, dialing a modem for on-line shopping, interactive network communication, and the like. Thus, the receiver function 188a may be classified into various categories, e.g.: (1) access or use of a receiver device (e.g., modem, tuner, etc.); (2) receiver functionality, such as performing interactive pay-per-view (IPPV) purchase, overriding parental lockout, starting and stopping an application (e.g., a VOD application), providing access to another application, etc.; and (3) read and/or write access to user data, such as user preferences (preferred language, list of favorite channels), user statistics (channels watched most often), user private data (user real name, credit card number, address, phone number, age, etc.) According to one embodiment, the receiver function 188a may be implemented by one or more software applications maintained on a CRM, as described earlier, in the STB 188 and executable by the CPU 188b, which is any of a number of computer processors mentioned earlier that are operable to execute computer-executable program instructions.

A common characteristic of the aforementioned receiver functions is that it is desirable to protect these functions from unauthorized access through implementation of the security function 188d, which receives and processes security policy data from one or more VOD headend servers 120 to enable the receiver function 188a in any known manner. The security function 188d, which may be implemented in hardware or software, is shown as a distinct element, although it should be appreciated that the proposed security architecture may be implemented as a function block without any special security hardware or software.

The user interface 188e allows a user to enter commands, e.g., to view the programming services and applications available from the receiver function 188a, using a conventional interface device, such as a hand held remote control. An appropriate graphical user interface (GUI) may be provided for this purpose. The user may also define or modify parameters (e.g., the security policy data) of the security function 188d, again preferably through an appropriate user-friendly interface.

The memory 188c may be implemented as a CRM as described earlier having a firmware and/or operating system (OS) of the STB 188 thereon for supporting operations by the STB 188 as further described later.

According to one embodiment, a user with access to a STB 188 may access a VOD application in the receiver function 188a therein to initiate a VOD session for VOD streaming. Subsequent to a set-up of a VOD session, as facilitated by an available one of the VOD headend servers 120 (e.g., as determined by the VOD headend office 110), the VOD application opens a standard network socket, bound to a reserved set-top UDP port, to send and receive VOD messaging for bi-directional signaling on the reserved UDP port to effect VOD-over-IP delivery. To support NAT at the multimedia router 182, the VOD application employs the standard network socket to: a) initiate an upstream message mapped or translated through the NAT in the multimedia router 182 for transmission to the video pump 130; and b) receive any acknowledgment of the initial NAT upstream message from the video pump 130 before any VOD streaming commences. The upstream messaging serves two purposes: a) it causes a NAT binding to be established between the destination set-top IP address/UDP port and the source IP address/UDP port of a video pump 130 for receiving video; and b) it provides the set-top IP address and the UDP port, as translated through NAT, to the video pump 130, which is used when streaming to a STB 188. According to one embodiment, the upstream message contains a valid VOD session identification (ID) so that the video pump 130 may verify and reference an established VOD session. Subsequent upstream messages may be sent by the VOD application at a given time interval to maintain the NAT binding.

Figure 2A:
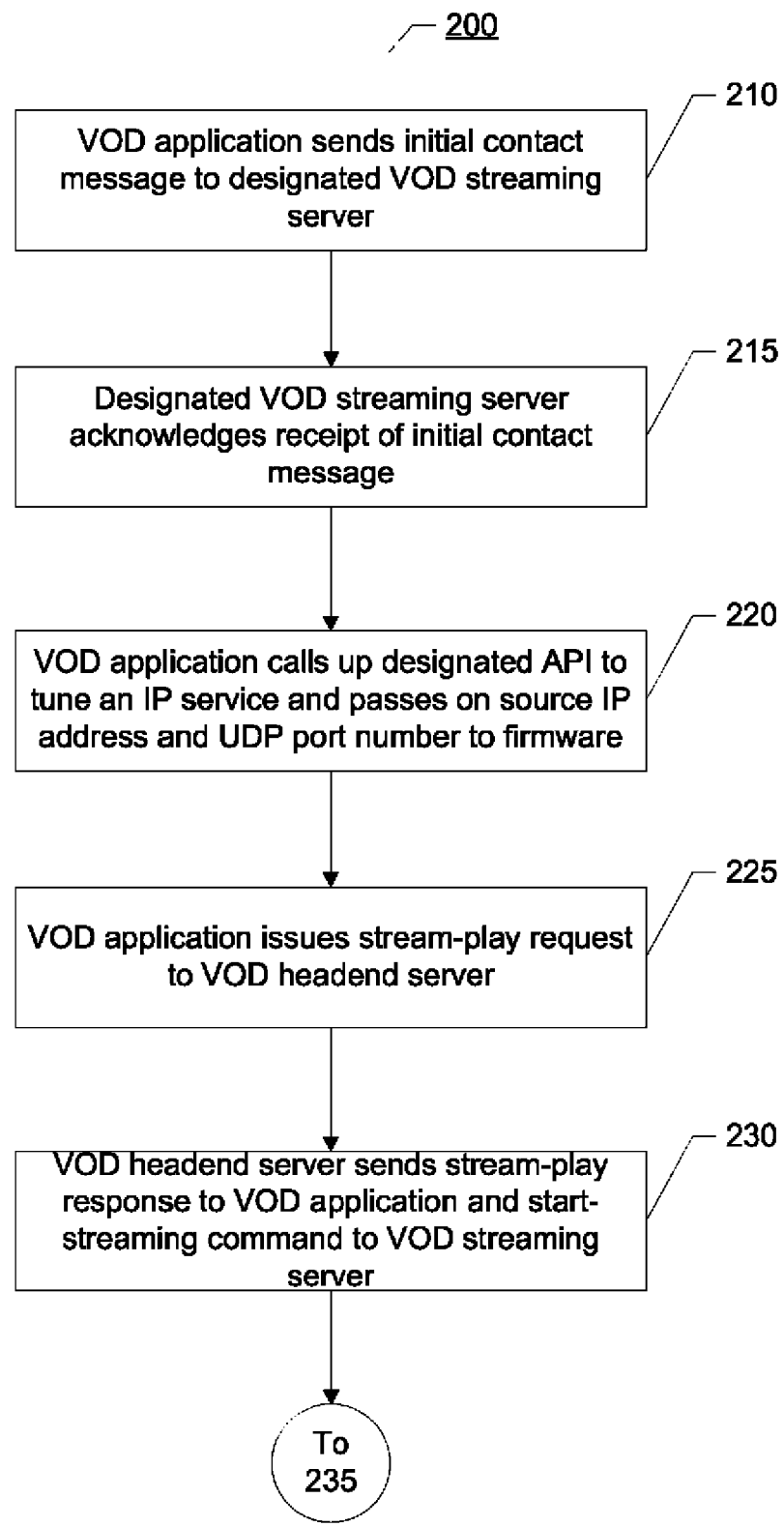
FIGS. 2A-B illustrate a process flow for streaming content over an IP network in a NAT environment, which is also applicable in a non-NAT environment.
Figure 2B:
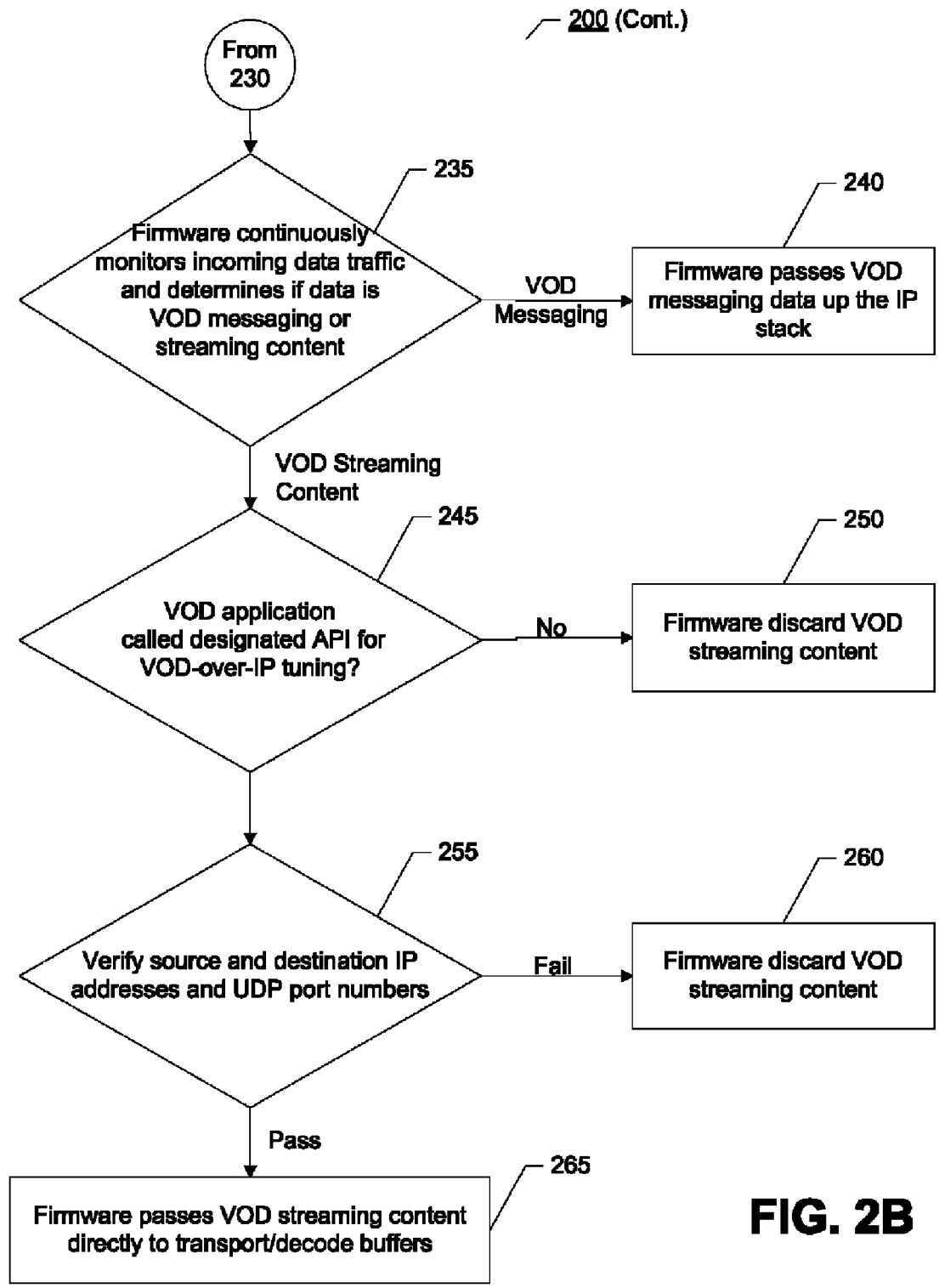

The VOD application is further operable to call a designated Application Programming Interface (API) residing in the receiver function 188a in the STB 188 to tune an IP service (for VOD-over-IP tune that constitutes the acquisition of IP-based content in FIGS. 2A-B) with the firmware in the memory 188c of the STB 188 by specifying the tuner number, service number, enhanced control, and session configuration (the last further including the source IP address and UDP port number), so that the firmware may receive the streaming content through the private IP address and bound UDP port number in a known manner. Tune retry logic may be added in the receiver function 188a if the IP-based tune is not successful in a defined time interval. If the IP-based tune ultimately fails, the VOD application may tune away or de-tune to free firmware resources. It should be noted that the order of tuning and issuing a stream-play request may be interchanged. The VOD application is further operable to send NAT heartbeat messages (i.e., additional upstream messages) to the video pumps 130 to maintain the NAT binding or messages to another server (another video pump 130 or a VOD headend server 120). When the streaming session has ended, the VOD application closes the network socket and tunes away or de-tunes the IP tuning resources that were in use.

The VOD application also passes on the source IP address and UDP port number of the designated video pump 130 to the firmware in the STB 188. When the video pump 130 receives a start streaming command from the VOD headend server 120, it starts streaming the VOD content to the destination IP address and UDP port obtained from the initial upstream message received from the VOD application.

The service path that is used to receive VOD-over-IP traffic is controlled by the firmware in the memory 188c of the STB 188 to maintain the tuning paradigm, using logical IP tuners, for IP services. This service path is highly optimized to provide a playback path for VOD over IP at high data rates. According to one embodiment, the firmware continuously monitors incoming data traffic on the VOD-over-IP reserved UDP port, regardless whether a VOD-over-IP tune is in effect, and determines if the data is VOD messaging or VOD streaming content. It also checks the incoming data packets to ensure that they originate from the correct source IP address and UDP port of a particular video pump 130. If the incoming data is VOD streaming content, the firmware directly sends such data to the transport/decode buffers in the STB 188, bypassing the IP stack therein. If the incoming data is VOD messaging, the firmware passes the data up the IP stack to the application. As referred herein, VOD messaging includes command data, control data, and/or metadata for metadata/navigation session management for content streaming. In other words, VOD messaging is data other than the streaming content that affect the streaming of such content. According to one embodiment, the firmware is designed and implemented so that it is operable with applications other than VOD applications that are used to receive UDP-based services, such as tickers, news services, or other 'push' content services.

Process

FIGS. 2A-B illustrate a process flow 200 for streaming VOD over IP in a NAT environment in accordance with an embodiment of the present invention. For illustrative purposes only and not to be limiting thereof, the process flow 200 is discussed in the context of the system illustrated in FIGS. 1A-B. The process flow 200 is to be implemented subsequent to a user at one of the residences 180 using a STB 188 to initiate a request for on-demand content, such as a movie, which results in a VOD session setup being established between a VOD headend server 120 and the STB 188. In addition to or as part of the VOD session setup, the source IP address and UDP port of an available video pump 130 designated by the VOD headend server 120 for streaming the on-demand content is communicated to the STB 188 and made available to the VOD application therein that initiated the VOD session (hereinafter, "initiated STB" and "initiated VOD application"). Also, it is assumed that each STB 188 has been provisioned with a private IP address and an IP address of a Domain Name System (DNS) for the content provider that maintains the VOD headend office 110. Furthermore, each STB 188 has acquired the IP address of its default gateway. The aforementioned addresses enable the initiated STB 188 to initiate communication with the VOD servers 120 and 130 at the VOD headend office 110.

At 210, the initiated VOD application opens a standard network socket to send an upstream message, as an initial contact message, through the NAT in the multimedia router 182 to the designated video pump 130 to create a NAT binding between the set-top IP address and UDP port and the NAT-translated IP address and UDP port (both as translated by the NAT in the multimedia router 182) that are seen by the video pump 130, whereby the initiated VOD application binds a UDP port number of the STB 188 to a predetermined reserved value. The initiated VOD application then uses this network socket for bi-directional signaling or communication with the designated video pump 130 in accordance with the setup VOD session, and it may open and close such network socket at will. In one embodiment, the NAT-translated IP address and UDP port number of the initiated STB 188 are sent by the initiated VOD application in the upstream message to the designated video pump 130, which uses such information as the destination endpoint for responding to the upstream message and streaming the requested on-demand content. Thus, this upstream message causes the NAT-translated IP address and UDP port number to be placed in the IP datagrams, or IP packets, of content streaming from the designated video pump 130 to STB 188. Consequently, NAT transparency is provided, wherein it does not matter which NAT type (e.g., full cone NAT, restricted cone NAT, port restricted cone NAT, and symmetric NAT), if any, is employed because communication between the designated video pump 130 and the STB 188 is now facilitated by the upstream message.

At 215, the designated video pump 130 optionally responds to the initial upstream message by sending an acknowledgement of the successful receipt of the upstream message back to the initiated VOD application in the STB 188, through the multimedia router 182.

At 220, the initiated VOD application then calls up a designated Application Programming Interface (API) to tune an IP service for receiving the streaming content and passes on the source IP address and UDP port number of the designated video pump 130 to the firmware in the STB 188.

At 225, the initiated VOD application issues a stream-play request to the VOD headend server 120, for the requested content to be streamed from the designated video pump 130. For example, the user decides to play the requested movie by issuing a command to the STB 188.

At 230, the VOD headend server 120 sends back a stream-play response to the initiated VOD application. For example, in response to the user's request to play the requested movie, the VOD headend server 120 may send back to the user a message confirming that the requested movie will be shortly streamed to the STB 188 for viewing by the user. In response to the stream-play request, the VOD headend server 120 also sends a start-streaming command to the video pump 130 to begin the content streaming. In one embodiment, the order of tuning the IP service and the stream-play request/response may be interchanged.

At 235, the firmware in the STB 188 continuously monitors the incoming data traffic on the VOD-over-IP reserved UDP port of the network socket, regardless whether a VOD-to-IP tune is in effect, and determines if the data is VOD messaging or VOD streaming content.

At 240, if the incoming data on the reserved UDP port of the STB 188 is VOD messaging data, the firmware passes the VOD messaging data up the IP stack in the STB 188 as normal, regardless whether a VOD-over-IP tune is in effect by the calling of the designated API.

At 245, however, if the incoming data on the reserved UDP port of the STB 188 is VOD streaming content (e.g., based on UDP payload length of the incoming data), the firmware further determines whether the designated API has been called for a VOD-over-IP tune.

At 250, if the designated API has not been called by the VOD application, i.e., no VOD-over-IP session is in progress, the VOD streaming content is discarded by the firmware.

At 255, if the designated API has been called by the VOD application, i.e., a VOD-over-IP session is in progress and the VOD application has passed information on the source IP address and UDP port number to the firmware, the firmware will verify the source and destination IP addresses and UDP port numbers of the incoming data packets.

At 260, if the source-and-destination address verification at 255 fails, the VOD streaming content is discarded.

At 265, if the source-and-destination address verification passes at 255, the firmware sends the VOD streaming content directly to the transport/decode buffers of the STB 188 for presentation to the user. According to one embodiment, the firmware does not keep a record of the UDP port used in the opened IP socket for signaling, and it does not interfere with the actions taken by the VOD application on that socket while a VOD-over-IP tune is in progress. Thus, if the VOD application closes the IP socket it uses for messaging, it is of no consequence to the firmware. The streaming session continues to be processed by the firmware, which continues to pass the VOD streaming content to the transport/decode buffers, bypassing the IP stack in the STB 188, until the VOD application tunes away or de-tunes. The firmware also permits VOD messaging data to go up the IP stack where it is discarded because the previously-opened IP socket is now closed.

Accordingly, the systems, methods and computer code described herein provide solutions to the VOD-over-IP problem in a NAT environment by having a set-top VOD application send an initial contact message directly to the VOD streaming server (video pump), using both the IP address and UDP port number predetermined to support the VOD session. These solutions permit the transparent migration of cable-based VOD applications to a VOD-over-IP environment that uses a multimedia router that supports NAT.

It should also be noted that the process flow 200 is sufficiently flexible for applications in either a NAT or non-NAT environment. In a non-NAT environment, wherein the multimedia router 182 does not support NAT, the process flow 200 at 210 is modified as follows. When the initiated VOD application in the STB 188 opens a standard network socket to send an upstream message through the multimedia 182 to the designated video pump 130, there is no NAT binding at the multimedia router 182. In other words, there is no address translation performed at the multimedia router 182, and the actual set-top IP address and UDP port of the STB 188 is provided in the upstream message to the designated video pump 130, which uses such information as the destination endpoint for responding to the upstream message and streaming the requested on-demand content. The process flow 200 then continues on as described above.

Accordingly, the various embodiments of the process flow 200 are operable to provide UDP/IP based video delivery transparently through a multimedia router with or without NAT support. They further enable a VOD application behind the multimedia router to have bi-directional communication with the streaming servers. There is no coupling of the socket operations with the tune operations because the firmware is tasked with monitoring the nature of the traffic on the bound set-top port used for streaming. The monitoring of data on the reserved port is done to prevent the set-top CPU from being overwhelmed by high speed streaming content passing through the IP stack. The set-top may perform very poorly in this case. This situation could arise if a video server started streaming to the set-top before the VOD-over-IP tune API was called. Also, if a set-top reset during a VOD streaming session, it may power up and start trying to pass the streaming content on the reserved port number up the stack. By having the firmware monitor data on a specific port number, it is unlikely that messaging information will not get passed up the stack to the application or that streaming content will go up the stack, regardless if the socket is open or closed.

The solution is flexible and allows the application to have complete control over the sequence of events. The firmware does not have to send an upstream initial message or keep track of sending heartbeat messages to maintain a NAT binding.

The process shown in FIGS. 2A and 2B may be implemented in a general, multi-purpose or single purpose processor. Such a processor will execute instructions, either at the assembly, compiled or machine-level, to perform that process. Those instructions can be written by one of ordinary skill in the art following the description of FIGS. 2A and 2B and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized wireline or wireless transmission signals.

What has been described and illustrated herein are various embodiments along with some of their variations. The terms, descriptions and figures used herein are set forth by way of illustration only and are not meant as limitations. Those skilled in the art will recognize that many variations are possible within the spirit and scope of the subject matter, which is intended to be defined by the following claims—and their equivalents—in which all terms are meant in their broadest reasonable sense unless otherwise indicated.

What is claimed is:

1. A method for streaming content over an Internet Protocol (IP) network by a content provider having a content control server and a content-streaming server, the method comprising the steps of:

the content control server receiving a first request via signaling from a destination device to set-up a content-streaming session;

the content control server setting up the content-streaming session in response to the first request, wherein an IP address and User Datagram Protocol (UDP) port at the IP address of the content-streaming server is provided to a destination device;

the content-streaming server receiving an upstream message from the destination device to establish a bi-directional communication link therebetween, the upstream message containing session specific information that references the set-up content-streaming session and is used to establish direct communication with the content-streaming server, which uses an IP address and port number of the destination device of the upstream message as the destination IP address and port number in accordance with the set-up content-streaming session;

the content control server receiving a second request via signaling to initiate streaming of the content for the set-up content-streaming session, the second request includes session set-up information, and the content control server instructs the content streaming server to start streaming content for the set-up content-streaming session; and the content-streaming server streaming the content to the destination device in response to the session start instructions from the content control server as initiated by the second request.

2. The method of claim 1, further comprising:
the content streaming server acknowledging receipt of the upstream message before any streaming commences.

3. The method of claim 1, wherein the streaming step includes streaming the content transparently in the bi-directional communication link through a multimedia router without NAT support.

4. The method of claim 1, further comprising the step of bypassing an IP stack of the destination device if it is determined that incoming content is streaming content.

5. The method of claim 4, wherein the bypassing step also includes determining whether there is a call for a tuning.

6. The method of claim 4, wherein the bypassing step also includes streaming content directly to the transport/decode buffers of the destination device.

7. The method of claim 1, wherein the content is Video On Demand (VOD), the content-streaming session is a VOD session, and the content-streaming server is a VOD-streaming server.

8. The method of claim 7, wherein the destination device is a set top box (STB) operable to receive the VOD.

9. A system for streaming content over an Internet Protocol (IP) network, comprising:
  a content control server operable to set up a content-streaming session for streaming the content in response to a first request via signaling from a destination device, wherein an IP address and User Datagram Protocol (UDP) port at the IP address of the content-streaming server is provided to the destination device;
  a content-streaming server operable for streaming the content in accordance with the content-streaming session and in response to an upstream message from the destination device to establish a bi-directional communication link therebetween, the upstream message containing session specific information that references the set-up content-streaming session and is used to establish direct communication with the content-streaming server, which uses an IP address and port number of the destination device of the upstream message as the destination IP address and port number in accordance with the set-up content-streaming session;
  a destination device operable to send a second request via signaling to initiate streaming of the content for the set-up content-streaming session, the second request includes session set-up information, and the content control server instructs the content streaming server to start streaming content for the set-up content-streaming session, wherein the destination device can receive streaming content from the content-streaming server in response to the session start instructions from the content control server as initiated by the second request; and
  a user interface connected to the destination device for viewing of the content by a user.

10. The system of claim 9, further comprising:
  a multimedia router operable to route data, as received from the content control server and the content-streaming server through the IP network using NAT translation of both the IP address and the UDP port between the content-streaming server and the destination device.

11. The system of claim 10, wherein the multimedia router is further operable to support additional upstream messages using network address translation between the content-streaming server and the destination device to maintain NAT binding.

12. The system of claim 11, wherein the content-streaming server is further operable to send an acknowledgement of the initiated contact to the destination device via the NAT-supported multimedia router before any streaming commences.

13. The system of claim 9, wherein the content is a video on demand (VOD), and the content-streaming session is a VOD session, and the content-streaming server is a VOD-streaming server.

14. The system of claim 13, wherein the destination device is a set top box (STB) operable to receive the VOD.

15. The system of claim 9, wherein the IP network is one of a public data network and a private data network.

16. The method of claim 1, wherein the streaming step includes streaming the content transparently in the bi-directional communication link through a multimedia router with NAT support.

* * * * *